March 20, 1956 K. FROEHLICH 2,738,778
INTERNAL COMBUSTION ENGINE (CYLINDER HEAD)
Filed Nov. 17, 1953 3 Sheets-Sheet 1

Inventor
Kurt Froehlich
by Parker & Carter
Attorneys

March 20, 1956  K. FROEHLICH  2,738,778
INTERNAL COMBUSTION ENGINE (CYLINDER HEAD)
Filed Nov. 17, 1953  3 Sheets-Sheet 2
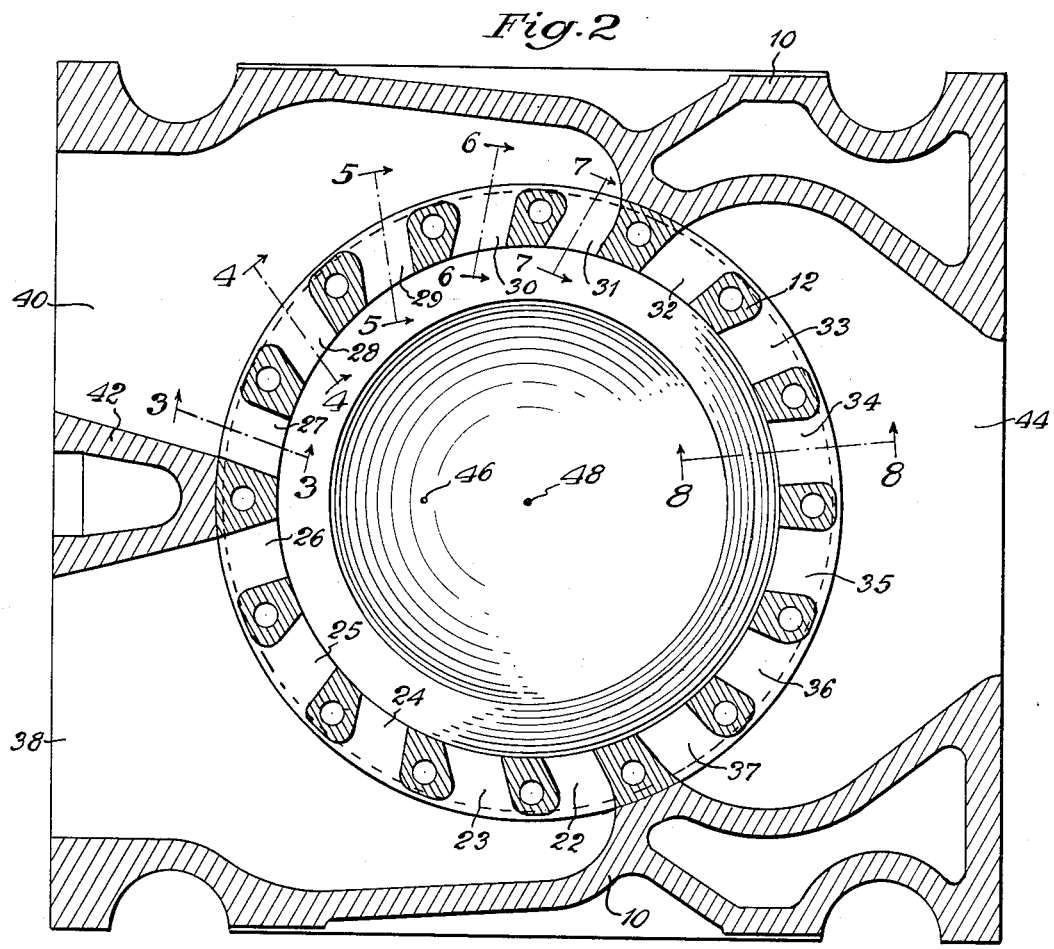
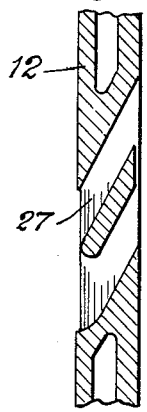 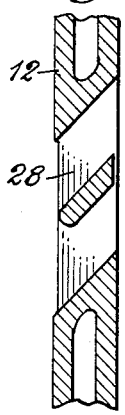 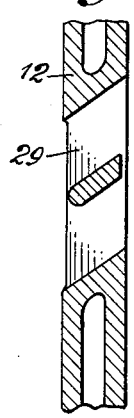 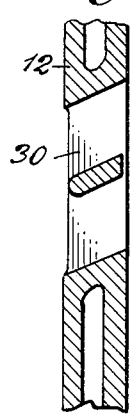 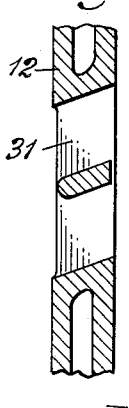 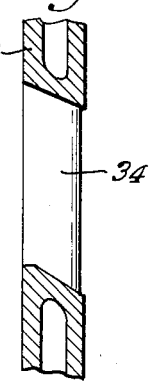
Inventor
Kurt Froehlich
by Parker & Carter
Attorneys March 20, 1956  K. FROEHLICH  2,738,778
INTERNAL COMBUSTION ENGINE (CYLINDER HEAD)
Filed Nov. 17, 1953  3 Sheets-Sheet 3

Inventor
Kurt Froehlich
by Parker & Carter
Attorneys

United States Patent Office

2,738,778
Patented Mar. 20, 1956

2,738,778

INTERNAL COMBUSTION ENGINE (CYLINDER HEAD)

Kurt Froehlich, Milwaukee, Wis., assignor to Nordberg Manufacturing Company, Milwaukee, Wis., a corporation of Wisconsin Application November 17, 1953, Serial No. 392,610

3 Claims. (Cl. 123—32)

This is a continuation-in-part of application, Serial No. 773,755, filed September 13, 1947, now abandoned.

My invention resides in the field of internal combustion engines and is an improvement on prior engines for effecting a more even distribution of the injected fuel in the combustion space.

My invention can be used primarily in a two-stroke cycle engine in which a swirling mass of gas or air is set up by loop scavenging in the cylinder of the engine. However, it should be understood that the same type of swirling gases can be set up in a cross-scavenged two stroke cycle engine and my invention can also be applied equally well to that type of engine.

A primary object of my invention is a method and apparatus for effecting a more even distribution of the injected fuel and a more even burning of the fuel in the combustion space of a conventional diesel engine.

Another object of my invention is to more evenly distribute the injected fuel in the turbulent swirling mass of air in the engine cylinder to effect an optimum distribution of the fuel and a more efficient mixing of the fuel with the swirling air so that more load can be carried by the engine.

Other objects will appear from time to time in the ensuing specification and drawings in which:

Figure 2 is a sectional view taken along lines 2—2 of Figure 1;

Figure 1:
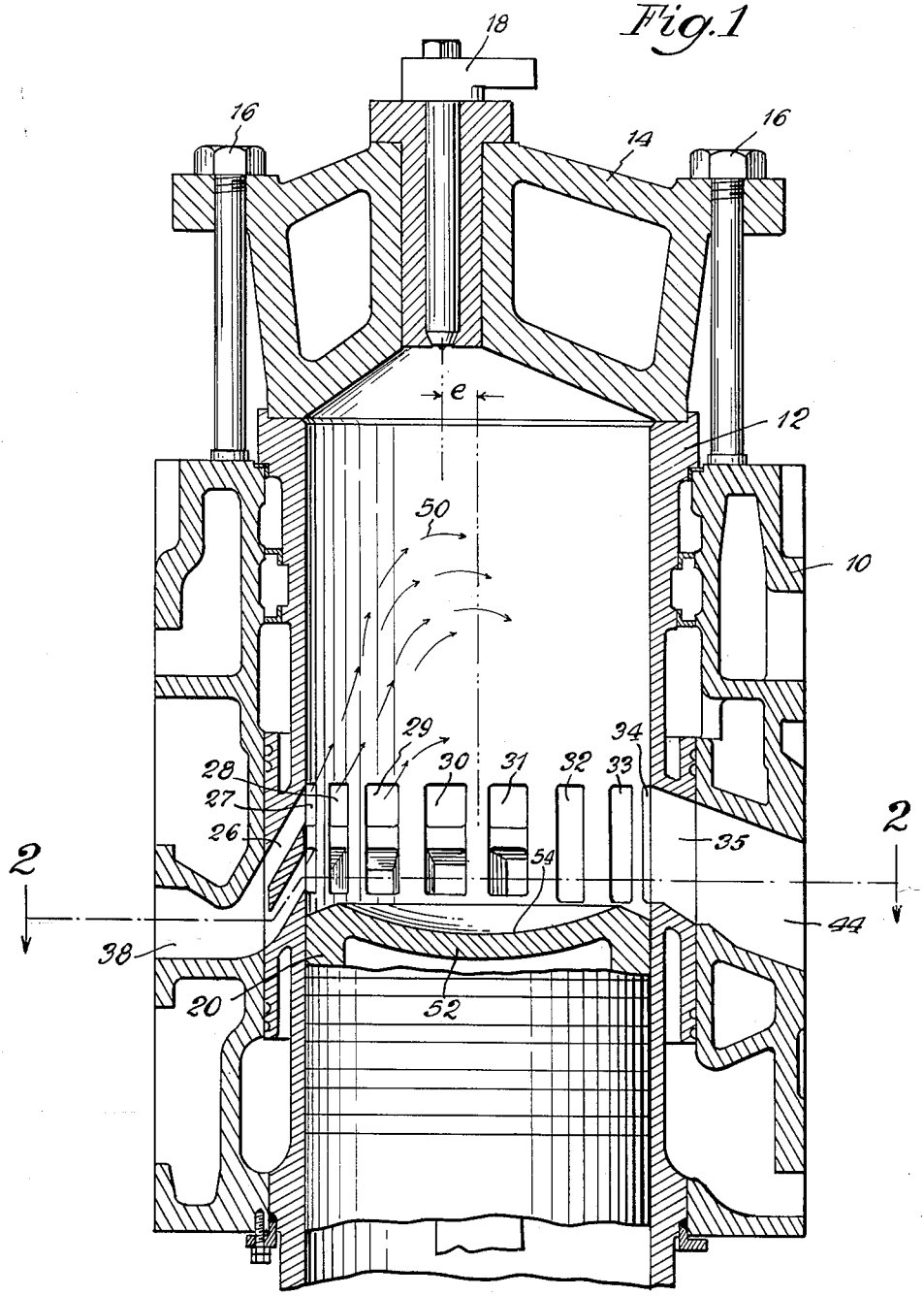
Figure 1 is a diagrammatic sectional view through a two-stroke cycle diesel engine with the piston at the lower end of the exhaust stroke near bottom dead center.
Figure 9:
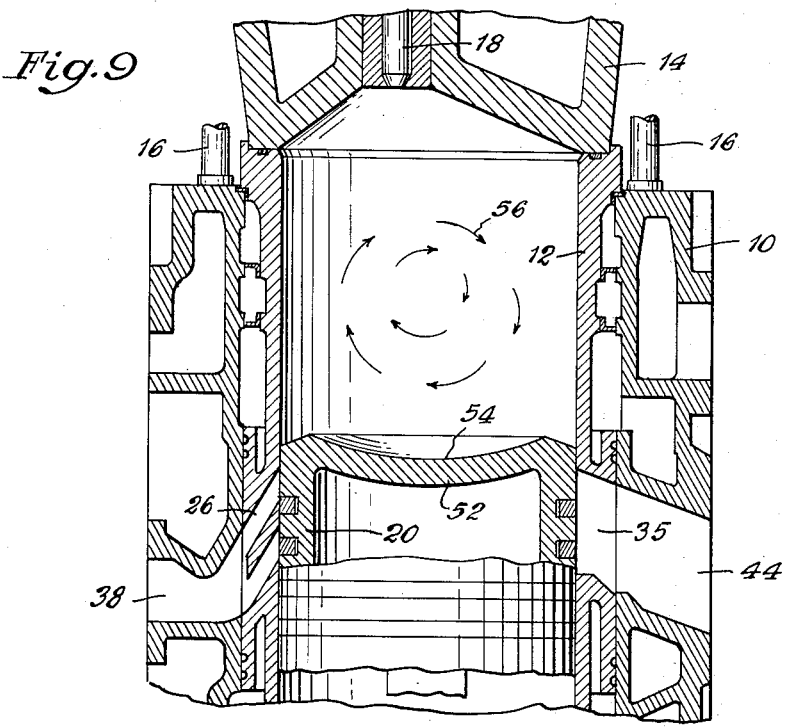
Figure 10:
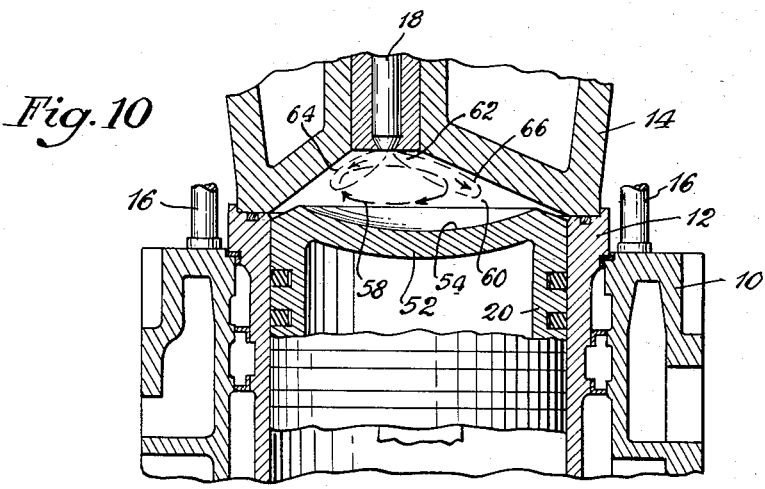

Figures 3 through 8 are sectional views taken along lines 3—3 through 8—8 respectively in Figure 2;

Figure 9 is a view on a reduced scale, similar to Figure 1, showing the piston during its compression stroke; and Figure 10 is a view similar to Figure 9 showing the position of the piston near top dead center during injection of the fuel.

In Figure 1, I have shown an engine with a cylinder 10 and a cylinder liner 12. A cylinder head 14 is secured to the cylinder in the usual manner by a plurality of suitable bolts 16. A conventional fuel injector 18 is positioned in the cylinder head to supply the necessary fuel for the engine. A piston 20 is positioned in the engine and adapted to reciprocate therein in a conventional manner. The connecting rod assembly and crankshaft for the piston are not illustrated as they form no part of the present invention.

A plurality of approximately equally spaced inlet ports, 22 to 31 inclusive, extend around a substantial portion of the circumference of the wall of the cylinder liner, as shown in Figure 2. The remainder of the cylinder liner wall has a plurality of approximately equally spaced exhaust ports, 32 to 37 inclusive. All of the inlet and exhaust ports are opened and closed by the piston during its expansion and compression strokes.

Inlet passages 38 and 40 in the cylinder communicate with the inlet ports, the passage 38 covering inlet ports 22 to 26 inclusive and passage 40 covering inlet ports 27 to 31 inclusive. Passages 38 and 40 are separated by a dividing wall 42. An exhaust passage 44 in the cylinder covers all of the exhaust ports in the cylinder liner.

The inlet ports are disposed at a substantial angle with respect to the horizontal, so that the inlet air is directed upwardly into the top of the cylinder. The angle of disposition of the inlet ports decreases around the cylinder with ports 26 and 27 adjacent the dividing wall 42 having the largest angle, as shown by Figure 3, and ports 22 and 31 having the smallest angle, as shown by Figure 7. The inlet ports between these ports vary progressively. Figures 4, 5, and 6 show the disposition of the ports between the Figure 3 inlet ports and the Figure 7 inlet ports.

All of the inlet ports are directed inwardly at a point 46 which is offset with respect to the center axis 48 of the cylinder, as shown in Figure 2. All of the exhaust ports have approximately the same angular disposition with respect to the horizontal, as shown in Figure 8, and all of the exhaust ports are directed approximately toward the center axis of the cylinder.

The inlet ports and the exhaust ports are designed in the above-described manner to effect proper scavenging of the cylinder. The inlet air is directed toward the top of the cylinder by the angular disposition of the inlet ports 22 to 31. This results in the momentary formation of a loop of moving air through the top of the cylinder, as shown at 50 in Figure 1. When the piston moves up and closes the inlet and exhaust ports, this loop of air is cut off. The top 52 of the piston is slightly dish shaped, as shown at 54 in Figure 1, and this dished formation of the piston in combination with the cylinder walls and the cylinder head converts the looping movement of the air into a swirling or rotary movement, as shown at 56 in Figure 9. As the piston progressively approaches top dead center, the diameter of the swirling air decreases until, as shown at 58 in Figure 10, it reaches a minimum.

When the piston is approximately at top dead center, the top of the piston and the cylinder head define a combustion space 60, and fuel is injected into it. As shown in Figure 1, the fuel injector 18 is not positioned directly on the center axis of the cylinder, but is offset slightly a distance $e$. The direction of the offset is against the current of the rotating air. The fuel is injected in a cone-shaped pattern or formation 62 which is directed downwardly and outwardly substantially parallel to the upper surfaces of the combustion space formed by the cylinder head. That portion 64 of fuel which is directed against the current of the mass of rotating air will be retarded in its movement toward the side of the combustion space because it is moving against the current. That portion 66 of the fuel which is directed with the mass of rotating air will be accelerated toward the side of the combustion space because it is moving with the current. The portion 66 moves faster than the portion 64. Consequently, in Figure 10, it is longer but it has a greater distance to travel. I have offset the point of injection by the distance $e$ so that the retarded portion 64 of the fuel will have a shorter distance to travel than the accelerated portion 66 before reaching the side of the combustion space.

When the fuel in a disel engine is injected into the combustion space, it performs two functions; namely, the mixing of the air with the fuel and the ignition of the mixture. As the fuel pattern is formed during injection, the fuel begins to mix with the air and at the same time ignition begins. As the fuel pattern diverges in opposite directions toward the extremity of the combustion space, the fuel will ignite and burning will take place. By offsetting the point of injection by the distance e against the current of the swirling mass of air, the burning mixture of fuel and air will reach all extreme points of the combustion space at approximately the same time. This definitely improves the combustion properties of the engine and enables it to carry more load.

I have shown only one embodiment of a two-cycle engine adapted to set up a swirling mass of air in the cylinders after the piston has closed the ports, and it should be understood that there are several other engines which will accomplish this. Accordingly, the invention is not limited to the specific details of the ports, cylinder and piston, as shown and described.

It should also be understood that the invention is not limited to a loop scavenging engine necessarily, because there are various types of so-called cross scavenging two-stroke cycle engines which will set up a swirling mass of air in the top of the cylinder after the piston has closed the ports. Nevertheless, I have described and illustrated my invention as applied to a loop scavenging engine, because cross scavenging engines are no longer in extensive use. In either type, the point of injection is slightly offset against the current of the swirling mass of air in the combustion space so that a more thorough mixing and distribution of the fuel with the air is acquired, and the engine will carry more load.

Various modifications, alterations and changes can be made without departing from the functional theme of my invention and I desire that the invention be unrestricted except as by the appended claims.

I claim:

1. In a two-stroke cycle compression ignition engine, a cylinder and cylinder head, a piston mounted to reciprocate therein to define expansion and compression strokes, inlet and exhaust ports for the wall of the cylinder, the exhaust ports being generally disposed on one side of the cylinder, the inlet ports being generally disposed and positioned in the wall of the cylinder so that, as a group, they are generally directed toward the other side of the cylinder to set up a swirl of air in the cylinder with the axis generally lateral to the axis of the cylinder, the cylinder head and piston being constructed to maintain the air during compression in a swirl with its axis disposed generally laterally in the cylinder, and means for injecting a generally symmetric diverging pattern of fuel into the air swirl when the piston is around top dead center, the fuel injecting means being offset relative to the center of gravity of the air swirl so that the center line of the injected fuel pattern, relative to the axis of the air swirl, is offset in a direction opposite to the flow of air in the air swirl moving past the point of injection.

2. The structure of claim 1 in which the inlet ports, as a group, are disposed so that the axis of the resulting air swirl generally intersects the axis of the cylinder.

3. The structure of claim 1 in which the fuel injecting means is positioned so that the resulting fuel pattern is injected at a point generally offset toward the said other side of the cylinder.

References Cited in the file of this patent

UNITED STATES PATENTS

| | | |
|---|---|---|
| 1,139,898 | Newcomb | May 18, 1915 |
| 1,226,630 | Bie | May 22, 1917 |
| 1,839,576 | Mohr et al. | Jan. 5, 1932 |

FOREIGN PATENTS

| | | |
|---|---|---|
| 614,487 | France | Dec. 10, 1926 |
| 818,526 | France | Sept. 28, 1937 |
| 211,353 | Switzerland | Dec. 2, 1940 |
| 819,332 | Germany | Oct. 31, 1951 |
| 875,100 | Germany | Apr. 30, 1953 |